(12) United States Patent
Donley et al.

(10) Patent No.: US 9,762,484 B2
(45) Date of Patent: Sep. 12, 2017

(54) ROLE BASED ROUTER FUNCTIONALITY (71) Applicant: Cable Television Laboratories, Inc., Louisville, CO (US)

(72) Inventors: Christopher J. Donley, Broomfield, CO (US); Michael Kloberdans, Brighton, CO (US); Christopher Grundemann, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 350 days.

(21) Appl. No.: 14/668,389

(22) Filed: Mar. 25, 2015

(65) Prior Publication Data

US 2015/0200806 A1 Jul. 16, 2015

Related U.S. Application Data

(63) Continuation of application No. 14/250,444, filed on Apr. 11, 2014, which is a continuation-in-part of application No. 13/792,016, filed on Mar. 9, 2013.

(60) Provisional application No. 62/105,142, filed on Jan. 19, 2015, provisional application No. 61/771,807, (Continued)

(51) Int. Cl.
| | |
|---|---|
| *G06F 15/16* | (2006.01) |
| *H04L 12/741* | (2013.01) |
| *H04L 12/775* | (2013.01) |
| *H04L 29/12* | (2006.01) |
| *H04L 12/24* | (2006.01) |

(Continued)

(52) U.S. Cl.
CPC .......... *H04L 45/74* (2013.01); *H04L 41/0816* (2013.01); *H04L 45/58* (2013.01); *H04L 61/2015* (2013.01); *H04L 45/46* (2013.01); *H04L 61/6004* (2013.01); *H04L 61/6059* (2013.01); *H04L 63/0254* (2013.01); *Y02B 60/43* (2013.01)

(58) Field of Classification Search
CPC . H04L 45/74; H04L 41/0816; H04L 61/2015; H04L 45/58; H04L 63/0254; H04L 61/6059; H04L 45/46; H04L 61/6004; Y02B 60/43

See application file for complete search history.

(56) References Cited

U.S. PATENT DOCUMENTS

| | | | |
|---|---|---|---|
| 7,272,643 B1 * | 9/2007 | Sarkar | H04L 12/4641 370/392 |
| 7,729,312 B2 | 6/2010 | Suzuki | |

(Continued)

OTHER PUBLICATIONS

Cisco. "IPv6 Rapid Deployment: Provide IPv6 Access to Customers over an IPv4-Only Network". 2011. pp. 1-14.*

(Continued)

*Primary Examiner* — John MacIlwinen
(74) *Attorney, Agent, or Firm* — Great Lakes Intellectual Property, PLLC.

(57) ABSTRACT

Configuration of tunnel, firewall and/or other positional based functionality for routers operating within a multi-router network is contemplated. The functionality configured for one or more of the routers may be implemented automatically without manual input or identification, such as to facilitate an off-the-shelf implementation process where positioning and attendant functionality is routinely implemented according to a predefined set of roles.

17 Claims, 6 Drawing Sheets

Related U.S. Application Data filed on Mar. 2, 2013, provisional application No. 61/712,318, filed on Oct. 11, 2012.

(51) Int. Cl.
*H04L 12/715* (2013.01)
*H04L 29/06* (2006.01)

(56) References Cited

U.S. PATENT DOCUMENTS

| | | | |
|---|---|---|---|
| 7,751,405 B1* | 7/2010 | Kompella | H04L 12/4633 370/254 |
| 7,843,923 B2 | 11/2010 | Baum | |
| 8,059,661 B2 | 11/2011 | Patel | |
| 8,307,422 B2 | 11/2012 | Varadhan | |
| 8,451,844 B2 | 5/2013 | Boucadair | |
| 8,576,857 B2 | 11/2013 | Singh | |
| 8,681,695 B1* | 3/2014 | Krishnan | H04L 61/2015 370/328 |
| 8,737,396 B2 | 5/2014 | Nishiyama | |
| 2006/0203804 A1 | 9/2006 | Whitmore | |
| 2008/0259925 A1 | 10/2008 | Droms | |
| 2009/0024745 A1 | 1/2009 | Short | |
| 2011/0134931 A1 | 6/2011 | Merwe | |
| 2011/0182295 A1 | 7/2011 | Singh | |
| 2012/0314617 A1 | 12/2012 | Erichsen | |

OTHER PUBLICATIONS

Laine et al.IBM Research Report. "Designing Modular Overlay Solutions for Network Virtualization". IBM Research Division. Aug. 28, 2011. pp. 1-7.*

Mahalingam et al. RFC 7348. "Virtual eXtensible Local Area Network (VXLAN): A Framework for Overlaying Virtualized Layer 2 Networks over Layer 3 Networks". Aug. 2014. pp. 1-22.*

Donley and Grundemann. "Customer Edge Router Identification Option". draft-donley-dhc-cer-id-option-01. Sep. 6, 2012. pp. 1-5.*

International Search Report and Written Opinion for Related PCT Application, Dec. 23, 2013, 8 pages.

Network Working Group, RFC 3633, 1Pv6 Prefix Options for Dynamic Host Configuration Protocol (DHCP) version 6, Dec. 2003.

How IPv6 Works by Microsoft Technet (Mar. 2003.

Dynamic Host Configuration Protocol for IPv6 (DHCPv6) Network Working Group Request for Comments: 3315 Jul. 2003.

An IPv6 Aggregatable Global Unicast Address Format Network Working Group Request for Comments: 2374 Jul. 1998.

* cited by examiner

ROLE BASED ROUTER FUNCTIONALITY

CROSS-REFERENCE TO RELATED APPLICATIONS

This application claims the benefit of U.S. provisional application 62/105,142, filed Jan. 19, 2015, and is a continuation-in-part of U.S. application Ser. No. 14/250,444, filed Apr. 11, 2014, which in turn is a continuation-in-part of U.S. application Ser. No. 13/792,016, filed Mar. 9, 2013, which in turn claims the benefit of U.S. provisional Application No. 61/771,807 filed Mar. 2, 2013 and U.S. provisional Application No. 61/712,318 filed Oct. 11, 2012, the disclosures of which are hereby incorporated in their entireties by reference herein.

TECHNICAL FIELD

The present relates to configuring functionality for routers included within a multi-router network, such as but not necessary limited to dynamically varying router functionality according to router positioning within the multi-router network.

BACKGROUND

A multi-router network may be characterized as a network having a plurality of routers connected together and arranged in a logical hierarchy. With the launch of new services, such as but not limited to home security, IP video, Smart Grid, etc., and more consumer devices, such as but not limited to televisions, mobile phones, appliances, etc., being configured with routers, multi-router networks are becoming more prevalent. Multi-router networks require multiple routers to communicate with each other over network links, such as to facilitate the establishment of messaging protocols, hierarchical relationships, address assignments, prefix delegations, security measures, backup capabilities and any number of additional functionalities in order to properly and securely govern network communications. As the prevalence of such multi-router networks continues to grow, one non-limiting aspect of the present invention contemplates a need to facilitate configuring routers to operate in such a complex environment.

Without intending to limit the scope of the present invention, and while not dispositive of environments where a need may exist to facilitate configuring routers, one non-limiting aspect of the present invention foresees a particular need in facilitating configuration of routers employed in small office and home office (SoHo) environments. SoHo and similar environments may employ routers having off-the-shelf, default, pre-configured and/or consumer-level configurations where the corresponding routers may be commonly referred to as home Internet Protocol (IP) network (HIPnet) routers. Such pre-configurations may thwart inter-router communications and other operations associated with facilitating use and/or construction of a multiple-router network. Default firewall and/or network address translator (NAT) settings of such HIPnet routers may disrupt or prevent inter-router communications, particularly communications from one subnet to another. Accordingly, one non-limiting aspect of the present invention contemplates facilitating configuration of HIPnet or other types of pre-configured routers for use in multi-router networks.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
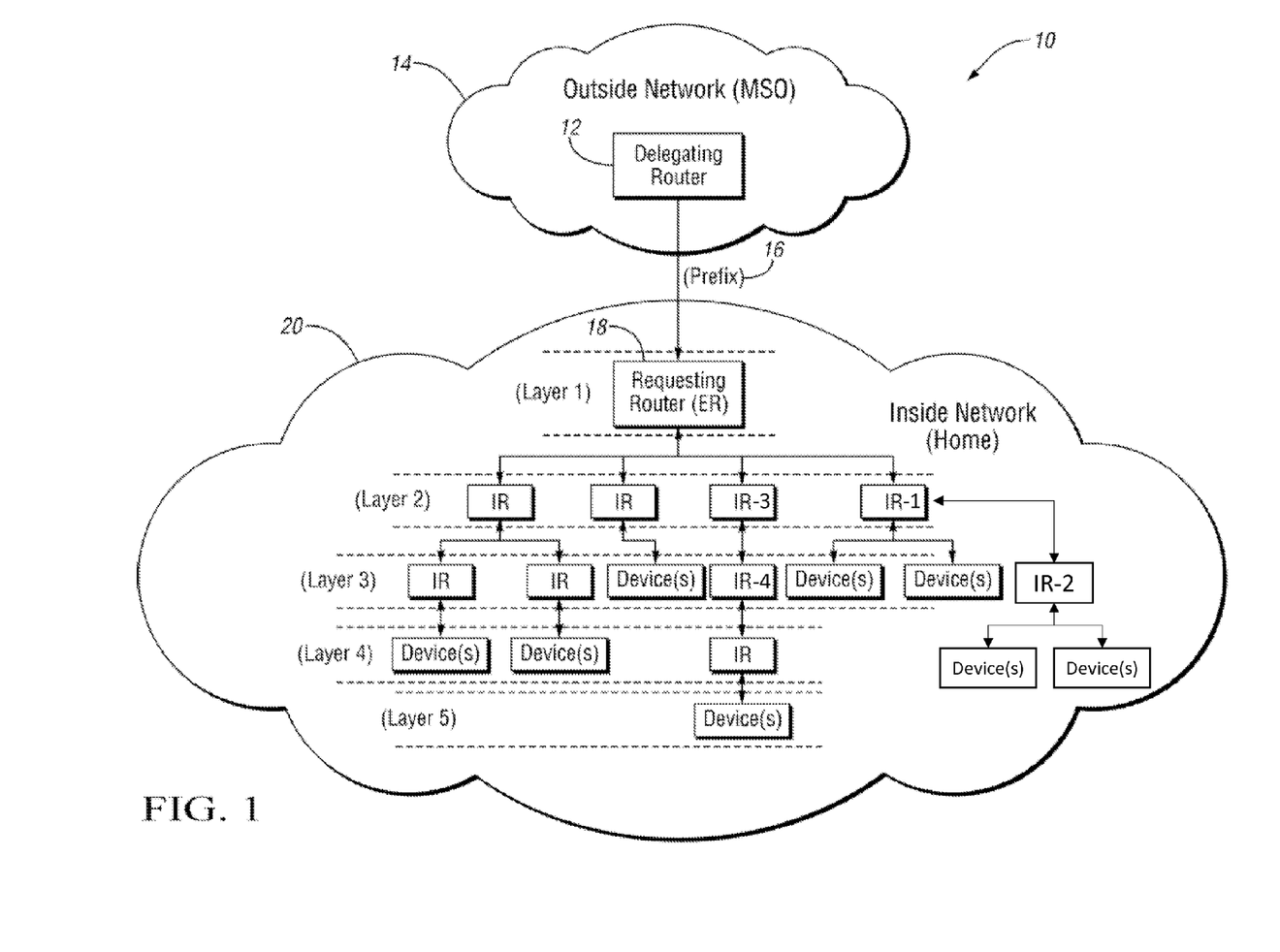
FIG. 1 illustrates a role based router system in accordance with one non-limiting aspect of the present invention.

FIG. 1 illustrates a role based router system 10 in accordance with one non-limiting aspect of the present invention. The system 10 illustrates one exemplary configuration where a delegating router 12 associated with an outside network 14 provides a prefix 16 to a requesting router 18 for delegation within an inside network 20. The prefix 16 may be any suitable addressing prefix, such as but not necessarily limited to an Internet Protocol version 6 (IPv6) prefix and an Internet Protocol version 4 (IPv4) prefix. The present invention is predominately described with respect to use of IPv6 without necessarily intending to limit the scope of the present invention. Dynamic Host Configuration Protocol (DHCP), such as that described in Internet Engineering Task Force (IETF) request for comment (RFC) 2131, 3315 and 3633, the disclosures of which are hereby incorporated by reference in their entireties, or other suitable delegation processes may be employed to facilitate delegating the prefix to the requesting router 18. The requesting router 18 may be configured to facilitate adaptively delegating the prefix 16 to additional routers associated with the inside network 20, such as in the manner described in U.S. patent application Ser. No. 13/783,242, entitled Adaptive Prefix Delegation, the disclosure of which is hereby incorporated by reference in its entirety.

The outside network 14 and the inside network 20 demonstrate one exemplary, non-limiting use of the present invention where a multiple system operator (MSO), Internet service provider (ISP) or other type of service provider is allocated a prefix or addressing domain by a suitable addressing entity to facilitate Internet-based messaging or other network-based messaging. The inside network 20 is shown to be distinguished from the outside network 14 to demonstrated one use case where an MSO may be tasked with facilitating messaging for a plurality of inside networks, such as but not necessarily limited to home networks or other internal networks associated with its subscribers. While only one inside network 20 is illustrated, the MSO may be responsible for facilitating prefix delegation with any number of inside networks or other downstream connected networks. The requesting router 18, which may be periodically referred to herein as a customer edge router (CER) or edge router (ER) where routers connected downstream thereof may be periodically referred to herein as internal routers (IRs). Optionally, the ER, IRs and/or devices may be configured to receive multiple prefixes, such as in the manner described in U.S. patent application Ser. No. 13/754,954, Reverse Prefix Delegation, the disclosure of which is hereby incorporated by reference in its entirety.

A five layer architecture is shown to correspond with a first layer having the ER, a second layer having one or more IRs connected directly to the ER, a third layer having one or more IRs and/or devices connected to one of the second layer IRs, a fourth layer having one or more IRs and/or devices connected to one of the third layer IRs, and a fifth layer having one or more devices connected to one of the fourth layer IRs. The IRs and/or devices are shown to be connected to a single upstream ER or IRs as such devices may be configured to listen to no more than one delegating router/device on a network link (solid lines) in order to comply with DHCP requirements. The single-connection of each component is shown for exemplary non-limiting purposes as the present invention fully contemplates the inside network having any number of configurations and interconnections between the ER, IRs and/or devices. The interconnections between the ER, IRs and devices are shown to correspond with wireline connections but may be similarly interconnected using wireless, radio frequency (RF), Bluetooth or other wireless types of links. One non-limiting aspect of the present invention contemplates the ER and/or the IRs being HIPnet routers or other consumer-level routers having off-the-shelf, default, pre-configured and/or consumer-level configurations whereby operations are automatically performed or implemented without user/manual manipulation and programming. The multi-router network 20 may also include non-HIPnet routers or routers otherwise lacking capabilities for performing the out-of-the-box functionality associated with the HIPnet routers.

One non-limiting aspect of the present invention contemplates a need to facilitate configuring capabilities and/or functionality of such routers to support inter-router communications within the multi-router network, including when such routers are deployed by network novices or other individuals lacking ability or desire to program, adjust or otherwise manipulating router functionality, including when the routers have disparate functionality, e.g., when a HIPnet router attempts to interact with a non-HIPnet router. The present invention contemplates enabling an automatic or self-configuration process for enabling router functionality, including functionality sufficient for the routers to communicate with each other over network links and/or to establish messaging protocols, hierarchical relationships, address assignments, prefix delegations, security measures, backup capabilities and a potential number of additional functional capabilities desired to properly and securely govern network communications. One non-limiting aspect of the present invention contemplates a role based router feature, such as but not necessary limited to a computer program product suitable to coordinate automatically, adaptively, routinely and/or dynamically selecting desired router functionality. The computer program product may be embedded in a non-transitory computer readable medium storing instructions, which when operable with a processor or other logically executing device, are sufficient for configuring router functionality.

Figure 2:
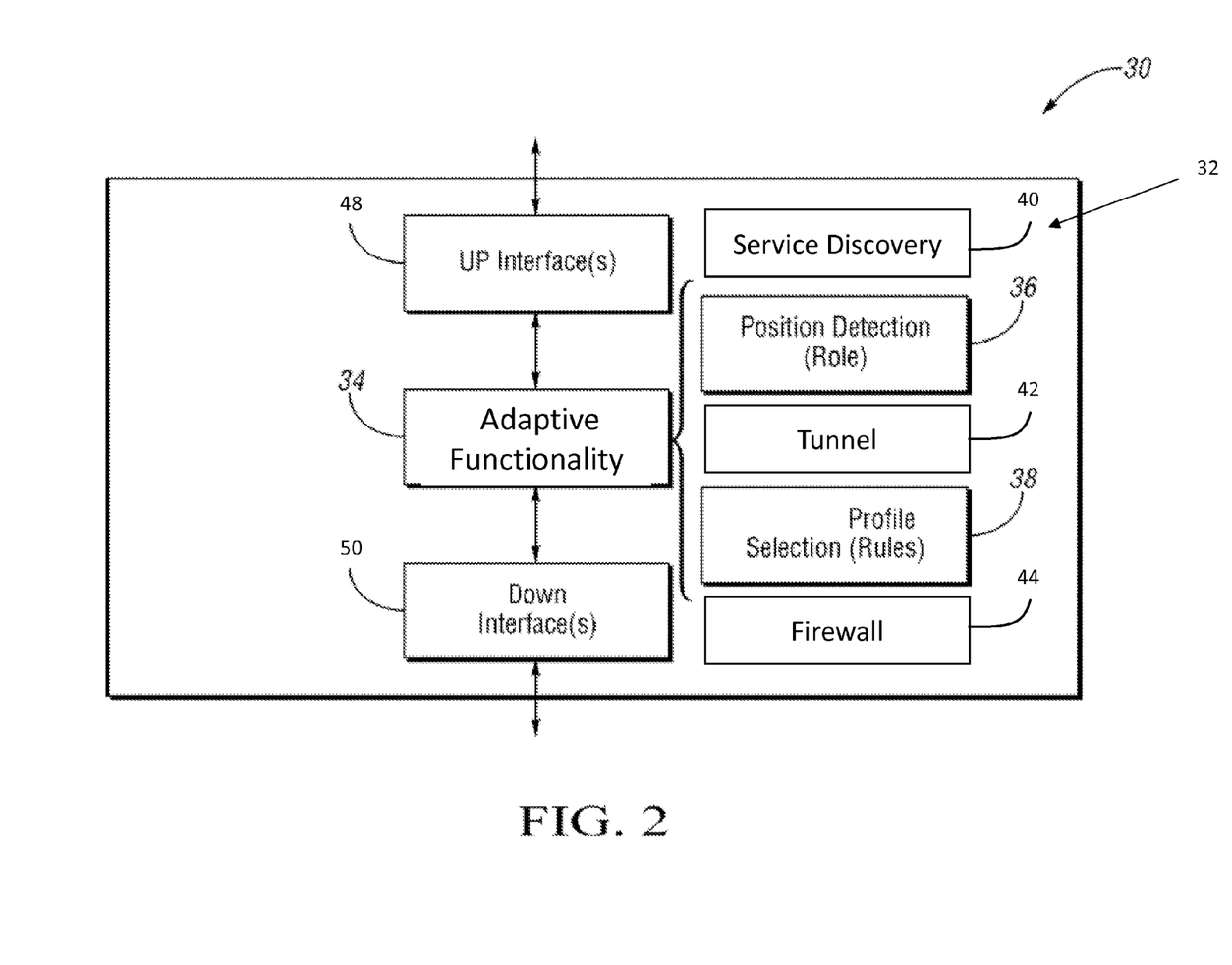
FIG. 2 illustrates a router having role based features in accordance with one non-limiting aspect of the present invention.

FIG. 2 illustrates an adaptive router 30 in accordance with one non-limiting aspect of the present invention. The router 30 may be deployed within the system 10 with a plurality of functionalities, modules or other logic constructs operable to adaptively control the router depending on network positioning, roles, entitlements, etc. These features 32 are shown to include a functionality module 34, a position detection module 36, a profile selection module 38, a service discovery module 40, a tunnel module 42 and a firewall module 44 although other configurations and/or modules may be included without deviating from the scope and contemplation of the present invention. The modules 34, 36, 38, 40, 42, 44 may be associated with a processor (not shown) to facilitate executing operations according to instructions stored in a computer-readable medium (not shown) or the modules 34, 36, 38, 40, 42, 44 may be otherwise associated with the router 30 to facilitate the contemplated operations. Optionally, the modules 34, 36, 38, 40, 42, 44 may be part of or embodied in a computer program product installable on the router 30 prior to deployment, downloaded thereto as part of the DHCP provisioning or other provisioning associated within initially providing internet access or access to other provider services, and/or included within a controller operable within the multi-router network 20 to facilitate router provisioning and functionality limitation. The modules 34, 36, 38, 40, 42, 44 and/or other logically executing features contemplated by the present invention may be used to facilitate automatically configuring functionality of the routers 30 deployed in the multi-router network 20 to automatically, adaptively and/or dynamically facilitate selection of desirable router functionality.

The router 30 is shown to include one or more of up interfaces 48 and one or more down interfaces 50. The router 30 may be a directionless router having a plurality of receptacles configured to facilitate connection to cables or other wired communication mediums used to communicate signals between other routers 30 within the multi-router network and/or wireless interfaces to perform similar operations. The interfaces 48, 50 may be adaptively assigned to an up direction and a down direction depending on positioning of the corresponding router within the multi-router network 20. The router 30 may include a directional processing feature (not shown) to facilitate individually assigning up/down directionality to each of the interfaces 48, 50, such as but not necessary limited to that described in U.S. patent application Ser. No. 13/792,023, entitled Interface Directionality Assignment, filed Mar. 9, 2013, the disclosure of which is hereby incorporated by reference in its entirety. While not intending to limit the scope and contemplation of the present invention and/or the positioning or hierarchical relevance of the corresponding router 30, the up interface(s) 48 may be associated with or characterize as a wide area network (WAN) interface and the down interface(s) 50 may be associated with or characterize as a local area network (LAN) interface. The router 30 may be configured to route messages, signaling and other information between the up interface(s) 48 and the down interface(s) 50, with signaling traveling in a downstream direction from the up interface(s) 48 to the down interface(s) 50 and upstream direction from the down interface(s) 50 to the up interface(s) 48.

The signaling traveling between the interfaces 48, 50 may be processed according to functionalities 32 associated with the router 30. The firewall module 44 may be part of a functionality controller 34 configured to process, control and otherwise manipulate data packets (messages, signaling, etc.) passed between the interfaces 48, 50. The firewall 44 may be configured to block, transmit, process or otherwise manipulate signaling between the interfaces 48, 50 according to various settings and configurations. The firewall module 44 demonstrates one use of the present invention to facilitate automatically configuring firewall functionality according to various parameters associated with the multi-router network 20. Optionally, the firewall functionality 44 may be selected according to a logical positioning of the corresponding router 30 within the multi-router network 20 in order to ensure desired inter-router communications and network security. While the firewall module 44 is illustrated, the present invention is not necessary limited to configuring firewall functionality and fully contemplates configuring other router functionality, including that described below in more detail. Configuring firewall functionality is believed to be particularly beneficial at least in that HIPnet routers or other pre-configured routers having adaptive capabilities may include default or pre-set firewall functionality that can prevent desirable inter-router communications if not properly adjusted upon router deployment within the multi-router network 20.

The firewall module 44 may be considered as a stateful firewall, such as that described in RFC 6092, the disclosure of which is hereby incorporated by reference in its entirety. The stateful firewall module 44 may facilitate stateful packet inspection (SPI) to selectively inspect and permit or deny transmission therethrough of packets, messages or other data types depending on a state of network connections, content, addresses and/or other information illustrative of the corresponding source/destination or otherwise reflective of the data transmission. The inspected information may be compared against a permitted set of information, database, signatures or other filtering related parameters to assess whether passage should be granted. The firewall module 44 may be deployed in a "default" state where packets other than those associated with an outgoing communication, i.e., a communication initiated from the router 30 to an upstream device and/or another router are blocked. The blocking of non-outgoing or upstream originating signaling may effectively prevent communications between routers (ER, IRs) and/or devices connected within the SoHo network (multi-router network) 20, including those connected to different subnets or links. This inability to support inter-router communications "out-of-the-box" can be particularly problematic to consumers attempting to use routers, devices having routers and/or devices within a multi-router network.

The firewall module 44 may be operable between an enabled state where stateful protection blocks all but upstream originating signaling and a disabled state where all signaling, including upstream originating signaling, is permitted, such as by turning "off" the firewall protection. One non-limiting aspect of the present invention contemplates the position detection module 36 determining a positioning of the router 30 within the multi-router network 20 and selectively enabling and disabling the firewall module 44 depending on the determined position. This may include the profiles selection module 38 having a set of rules for specifying enablement/disablement of the firewall module 44 and/or other functionality of the router 30 according to its determined position. The profile selection module 38 may include an edge profile, an internal profile or other position based profiles. The profiles may define a corresponding set of instructions, commands or other controls sufficient to achieve the desired functionality settings. Optionally, the instructions, etc., associated with the profiles may be stored on the router 30 as a part of the computer program product, application, software or other control mechanism of the router 30. The present invention contemplates the profiles defining edge instructions and internal instructions for dictating functionality depending on whether the router 30 is characterized as an ER or an IR without intending to limit the scope and contemplation of the present invention as other positional characterizations are contemplated.

The positioning detection module 36 may be configured to determine positioning of the router 30 or its role within the multi-router network, i.e., whether the router is an ER or an IR, as a function of messaging and/or addressing associated with assigning the router an address and/or a prefix. The role may be determined by performing a "48 check", a DHCPv6 CER-ID option and/or another type of positional determination, such as but not limited to a physical determination. The "48 check" may correspond with the position detection module 36 comparing the first 48 bits of the assigned IA_NA (address) to the first 48 bits of the assigned IA_PD (prefix) such that the router 30 is determined to be an IR if the first 48 bits of each match and an ER if the first 48 bits fail to match. For example, if IA_NA/SLAAC is in a different /48 from the IA_PD, the router 30 may be determined to be an ER, and if IA_NA/SLAAC is in the same /48 as its IA_PD, the router 30 may be determined to be an IR. If the router 30 does not obtain an IA_NA (e.g., because of being provisioned in an unnumbered fashion), then the router 30 may be determined as an ER. Certain devices, such as but not necessary limited to cellular devices, may obtain an IA_PD but not an IA_NA. These types of devices may be unnumbered due to the mobile operators attempting to save addresses by not sending IA_NA. In such circumstances, the unnumbered devices may obtain a WAN address from the IA_PD as opposed the IA_NA. In this manner, when the router 30 performs its edge detection test, it may recognize the combination of the absence of an assigned IPv6 address and the receipt of an assigned IPv6 prefix as indicative that the router 30 is at the edge of the network. If the router 30 is on the edge of the network, it may enable its firewall and IPv4 NAT; if it is interior to the network, it may disable the firewall module 44 and NAT and/or perform other operations as proscribed to it.

The DHCPv6 CER_ID option may correspond with the position detection module 36 utilizing a DHCPv6 option to identify whether the router 30 is an ER, and if not then determining the router 30 to be an IR. The DHCPv6 option may operate on the assumption that an ER sets a CER_ID (DHCPv6 option) to the IPv6 address of its LAN interface. If it has more than one LAN IPv6 address, it selects one of its LAN or loopback IPv6 addresses to be used in the CER_ID. An ISP server does not respond with the CER_ID or sets the CER_ID to ::, whereby receipt of such a response indicates the router is an ER and the failure to receive such a response indicates the router is an IR. In more detail, a DHCPv6 client may be configured to include the CER Identification option code in an Option Request option in its DHCP Solicit messages. The DHCPv6 server (delegating router) may include the CER Identification option in any response it sends to a client (requesting router) that has included the CER Identification option code in an Option Request option. The CER Identification option may be sent in the main body of the message to the client, optionally not as a sub-option, e.g., an IA_NA, IA_TA option. When sending the CER Identification option, the DHCPv6 server (delegating router) may set the CER_ID value to either one of its IPv6 addresses or ::. If a device (router) does not receive the CER Identification Option or receives a CER ID of :: from the DHCPv6 server, it may include one of its Globally Unique IPv6 address(es) in the CER_ID value in response to DHCPv6 messages received by its DHCPv6 server that contains the CER Identification option code in an Option Request option. If the device has only one LAN interface, it may use its LAN IPv6 address as the CER_ID value. If the device has more than one LAN interface, it may use the lowest Globally Unique address not assigned to its WAN interface.

The physical determination process for identifying ER and IR positioning may be based on some routers 30 having a physical differentiator built into them by design that will indicate that they are an ER. Examples include mobile routers, DSL routers, and cable eRouters. In the case of a mobile router, the presence of an active cellular connection indicates that the router 30 is at the customer edge. Likewise, for an eRouter, the presence of an active DOCSIS link tells the router that it is at the customer edge. HIPnet routers and others may use more than one of the above techniques in combination to determine the edge. For example, an internal router may check for the CER_ID option, but may also use the 48 check in case its upstream router does not support CER_ID.

In addition to the foregoing positional determination mechanisms, the present invention fully contemplates the use of other processes and/or features for routers 30 to determine the relative positioning within the logical hierarchy of a multi-router network 20. While contemplated, the positioning or hierarchical relevance of each router 30 may be determined without use of a routing protocol, such as Routing Information Protocol (RIP) and the Open-Shortest-Path-First protocol (OSPF), the disclosures of which are hereby incorporated by reference. The routing protocol may correspond with routing tables and other information provided to the router 30 to facilitate determining the relative position within the multi-router network 20. The routing tables may define routes between each one or more of the routers (ER, IRs) and/or known to the routers such that the receiving router 30 is then responsible for comparing the tables to determine its relative positioning. The capability of the present invention to facilitate positional determinations without use of such routing protocols may be advantageous with routers 30 that may not be configured with capabilities to process such routing tables, within environments where it may be difficult or impossible to provide desired routing tables to the routers 30 and/or to facilitate implementation of the contemplated role based router functionality selection without having to update or comply with routing protocol requirements.

While the foregoing utilizes positional determinations to facilitate selectively enabling and disabling firewall functionality, the present invention fully contemplates using positional determinations to facilitate implementing additional functionality in addition to or in place of the firewall functionality according to other rules or instructions set forth in a corresponding one of the profiles. The router 30, for example, may be configured with a default or pre-set network address translator (NAT) parameter, particularly if the router is and IPv4 router or a dual stack router, i.e., a router having IPv4 and IPv6 capability, whereby the default setting of the NAT parameter may thwart desired inter-router communications. The NAT parameters, similarly to the firewall parameters, may be set according to profile roles depending on whether the corresponding router is and ER or and IR, e.g., the NAT may be disabled when the router 30 is an IR and enable when the router is an ER. Additional role based policies may include:

An ER rule denying incoming traffic on its WAN interface 40 (except DHCP, Neighbor Discovery, ICMP, or pre-established TCP, UDP, or multicast streams, which may be subscriber selectable);

An ER rule blocking outgoing Port Control Protocol (PCP) and UPnP IGD messages on its WAN interface 40, except for a default list (e.g. peer-to-peer, SIP/VoIP, gaming, and http), which may be subscriber selectable;

An ER rule blocking site-scoped multicast messages from being sent to the WAN 40, while IRs forward site-scoped multicast messages out all interfaces 40, 42 (optionally, provided they pass a Reverse Path Forwarding check);

An IR rule enabling full support for PCP MAP messages. That is, the IR serves as a PCP server for all MAP messages, not just a limited subset;

An IR rule enabling operation as a UPnP/PCP gateway;

An IR rule enabling "Simple Security", such as that described in RFC 6092;

An IR rule enabling "Advanced Security", such as that described in I-D.vyncke-advanced-ipv6-security, the disclosure of which is hereby incorporated by reference in its entirety, which may optional provide Intrusion Detection/Intrusion Protection; and/or A special IR connecting rule enabling a "medium trust" network (e.g. SmartGrid) to filter PCP messages from the inside network to the special security zone network. The special security zone can be identified by ULA address space not used in the internal network.

Within the illustrated multi-router network 20, it may desirable for the router 30 to be equipped with stateful firewall capabilities. Such routers may provide "on by default" security where incoming traffic is limited to return traffic resulting from outgoing packets. It may also be desirable to allow users to create inbound 'pinholes' for specific purposes, such as online gaming, manually similar to those described in Simple Security. "Advanced Security" features optionally may be used to support the concept of end-to-end IPv6 reachability and could be added to provide intrusion detection (IDS/IPS) support. Local Network Protection for IPv6 (RFC4864), the disclosure of which is hereby incorporated by reference in its entirety, may be used to facilitate firewall functions that replace NAT security and calls for simple security. The present invention recommends that the ER enable a firewall by default and that IRs have at least one of the three options described below:

IR Firewall Option 1—Filtering Disabled: Once a home router determines that it is not the CER, it disables its firewall and allows all traffic to pass. The advantages of this approach is simple and easy to troubleshoot and it facilitates whole-home service discovery and media sharing. The disadvantages are that it does not protect home devices from each other (e.g. infected machines could affect entire home network).

IR Firewall Option 2—Simple Security+PCP: Home routers may have a stateful firewall on by default, regardless of CER/IR status but IRs allow "pin-holing" using PCP I-D.ietf-pcp-base, the disclosure of which is hereby incorporated by reference in its entirety. CERs can restrict opening PCP pinholes on the up interface. The advantages of this approach may be that it protects the home network from internal threats in other LAN segments and it mirrors legacy IPv4 router behavior. The disadvantages to this approach may be that it is less predictable; it relies on application "pin-holing", a "default deny" rule that may interfere with service discovery and/or content sharing, and requires PCP clients (e.g. on PCs and CPE devices).

IR Firewall Option 3—Advanced Security: Once a home router determines that it is not the CER, it may disable its stateful firewall and activate a firewall (IPS). The advantages to this approach may be that it protects the home network from internal threats in other segments and is more predictable than Option 2, since internal traffic is allowed by default. The disadvantages may be that adaptive filtering is more complex than static filtering and may require a "fingerprint" subscription to work well.

The foregoing describes recommended firewall behavior as device manufacturers and/or software providers may leverage the capabilities of the present invention to facilitate other role-based router functionality implementation, optionally according to positional determinations, to specify additional profiles and to make router security options user configurable. The router 30 is shown to also include the service discovery module 40 and the tunnel module 42, which may be adaptively engaged, disengaged or configured according to positional determinations of the positioning detection module 36 and/or according to roles/profiles associated with the profile selection module 38, such as in a manner similar to that described above with respect to the firewall module 44. The functionality module 34 may coordinate the activities of the various modules 36, 38, 40, 42, 44 according to a schedule, routine, program, etc. so as to ensure higher priority functions are implemented prior to lower priority functions, such as to ensure the firewall is properly installed before undertaking service discovery.

The security discovery module 40 may be configured to determine services information for devices connected to the router 30. The services information may relate to data collected from or provided to interconnected devices, such as to facilitate advertising capabilities, synchronizing state, enabling border discovery, facilitating address prefix distribution, naming and other service related operations associated with or available on a corresponding network link, e.g., available to each device connected directly to a downstream interface 50 of the router 30. The service discovery module 40 may operate according to various standards and protocols, such as but not necessary limited to Link Layer Discovery Protocol (LLDP), as described in IEEE 802.1AB, or Home Network Control Protocol (HNCP), described in the IETF Internet-Draft published Jan. 6, 2015, Bonjour and/or Multicast DNS (mDNS), as described in RFC 6762, UPnP as described in ISO/IEC 29341, the disclosures of which are hereby incorporated by reference in their entireties herein. Optionally, the service discovery may be performed across multiple network links, such as in the manner described in U.S. patent application Ser. No. 14/334,027, entitled Service Discovery Within Multi-Link Networks, the disclosure of which is hereby incorporated in its entirety herein.

The tunnel module 42 may be configured to facilitate tunneling, virtual links, overlay networking or otherwise delivering packets, messages, etc. between desired endpoints without exposing the data to intermediary hops (e.g., routers connected between an IR and an ER) and/or without requiring intermediary hops to operate according to a compliant protocol or standard, i.e., the endpoints may support the tunneling operation without requiring an intermediary hop to support the tunneling protocol. The tunnel module 42 may be configured to encapsulate packets for transmission between the router 30 and a desired endpoint, such as the ER if the router 30 is determined to be an IR and/or another IR. The encapsulation may be performed according to any suitable tunneling standard or protocol, including but not limited to Generic Router Encapsulation (GRE), Virtual Extensible Local Area Network (VXLAN), as described in RFC 7438, the disclosures of which are hereby incorporated by reference in their entireties herein. The tunnel module 42 may be adaptively configured upon router 30 deployment to facilitate tunneling desired information directly to the ER or other IR, such as to facilitate communicating services information determined with the service discovery module 40. The ability to tunnel or otherwise steer packets directly to the ER may be beneficial in enabling virtualization over the inside network (home network) 20 transparently from the underlying connectivity (e.g., intermediary hops).

Figure 3:
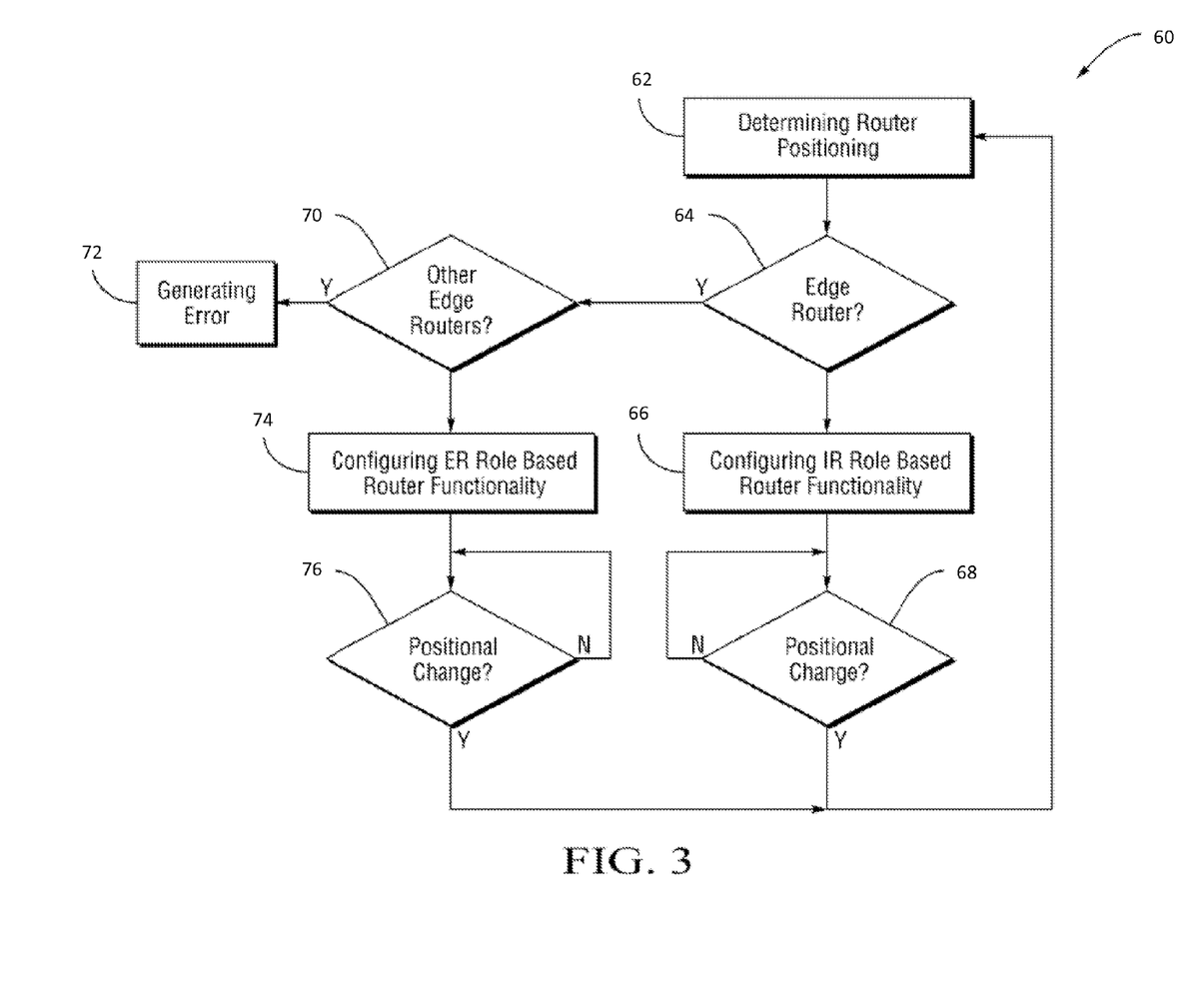
FIG. 3 illustrates a flowchart for a method of facilitating role based router functionality in accordance with one non-limiting aspect of the present invention.

FIG. 3 illustrates a flowchart 60 for a method of facilitating role based router functionality in accordance with one non-limiting aspect of the present invention. The method may be used to facilitate automatically configuring routers deployed within a multi-router network or other logical hierarchy defined by physical and/or wireless connectivity according to the roles played by each router. The method is predominately described with respect to the router roles being based on relative router positioning, which for exemplary non-limiting purposes is assumed to correspond with one of an internal position and an edge position. The internal position is characterized as the corresponding router being an IR having a wireline or wireless upstream connection either directly to an ER or another IR. The edge position is characterized as the corresponding router being an ER having a wireline or wireless upstream connection to a router outside of the multi-router network, such as that associated with an ISP, MSO or other service provider (e.g. a cable, satellite or broadcast television service provider; a cellular phone service provider, a voice over Internet protocol (VoIP) service provider; a content streaming/downloading source; etc.).

Blocks 62, 64 relates to determining router positioning. The routers may individually determine router positioning upon being connected within the multi-router network. The router positioning, for example, may be determined as a function of addressing or other messaging information provided to the connecting router upon establishing a connection within the multi-router network. Optionally, the routers may be instructed as to the relative positioning by a controller, network administrator or other features associated with the multi-router network. One non-limiting aspect the present invention contemplates the routers individually determining router positioning by comparing addressing bits, such as that associated with an IA_NA and/or IA_PD provided thereto and/or as a function of a CER_ID option. The router positioning determination may not necessarily be dispositive of the routers position relative to other similarly characterize routers, i.e., the router positioning inquiry may simply confirm whether the router is an ER or an IR. Once the router determines itself to be an IR, and while contemplated to do so, additional determinations regarding the router's positioning relative to other IRs need not be performed, which can be beneficial in ameliorating processing demands on the router.

Block 66 relates to configuring IR role based router functionality for the router after the router positioning determines the router to be an IR. The IR role based router functionality may be implemented according to an internal profile stored on the router and/or provided thereto. The internal profile may include roles, instructions, commands and/or other information associated with facilitating automatic configuration of the router according to desired role based functionality. The internal profiles may specify a plurality of internal instructions sufficient for automatically controlling the router to implement the desired functionality, such as to facilitate setting firewalls, NATs, tunnels and/or other capabilities of the router without requiring corresponding user interaction or programming of the router. Optionally, the configuring the IR role based functionality may include directing implementation of multiple functional capabilities according to a plurality of internal rules and/or profiles associated with the IR positioning determinations, which may be beneficial to facilitate implementing non-security and/or non-networking parameters for the router.

Block 68 relates to determining a positional change in the IR. The positional change may corresponding with a role of the router changing within the home network, such as in the event the router changes from an IR to an ER and/or if the router changes IR positions from one portion or subnet to another portion of subnet of the multi-router network. While the particular IR router positioning or subnet need not necessarily be determined, in the event certain internal router profiles are provided for certain portions or subnets (e.g. to set different security parameters for certain portions of the network), such a determination may be implemented in order to facilitate a correspondingly specific role based functionality. The router may also change from an IR characterization to an ER characterization in the event multi-homing occurs, the previously determined ER fails or requires temporary use of one of the IRs for backup, a change in hierarchical relationship is implemented and/or a connection of the IR not available to a previously determined ER is required to facilitate communications. In the event these or other positional changes are determined, Block 68 may be returned to facilitate implementation of corresponding role based functionality.

Block 70 relates to determining the router to be in the edge position and assessing whether additional edge positioned routers are active within the multi-router network. The assessment of Block 70 may be an optional step to check whether the prefix delegation processing and/or addressing assignment properly constructed the multi-router network to include a single ER or at least a single ER for the type of services, network, etc. being performed with the router attempting to implement role based functionality (e.g., the multi-router network may have virtual networks, tunnels, etc. that allow the use of multiple ERs for the corresponding services). Block 72 is reached in the event multiple edge positioned routers are determined to be in conflict to facilitate generating an error message or implementing other corrective action. In the event the multi-router network prevents multiple routers from being characterized as edge positioned and/or the router is unable to make such an assessment (e.g., the router may be unable to make such an assessment without utilizing router protocols), Block 70 may be bypassed in favor of directly proceeding to Block 74.

Block 74 relates to configuring ER role based router functionality for the router after the router positioning determines the router to be an ER. The ER role based router functionality may be implemented according to an edge profile stored on the router and/or provided thereto. The edge profile may include roles, instructions, commands and/or other information associated with facilitating automatic configuration of the router according to desired role based functionality. The edge profiles may specify a plurality of edge instructions sufficient for automatically controlling the router to implement the desired functionality, such as to facilitate setting firewall, NAT and/or other capabilities of the router without requiring corresponding user interaction or programming of the router. Optionally, the configuring the ER role based functionality may include directing implementation of multiple functional capabilities according to a plurality of edge rules and/or profiles associated with the ER positioning determinations, which be beneficial to facilitate implementing non-security and/or non-networking parameters for the router. Block 76 relates to performing a positional change assessment for the ER similar to the manner described in Block 68.

Figure 4:
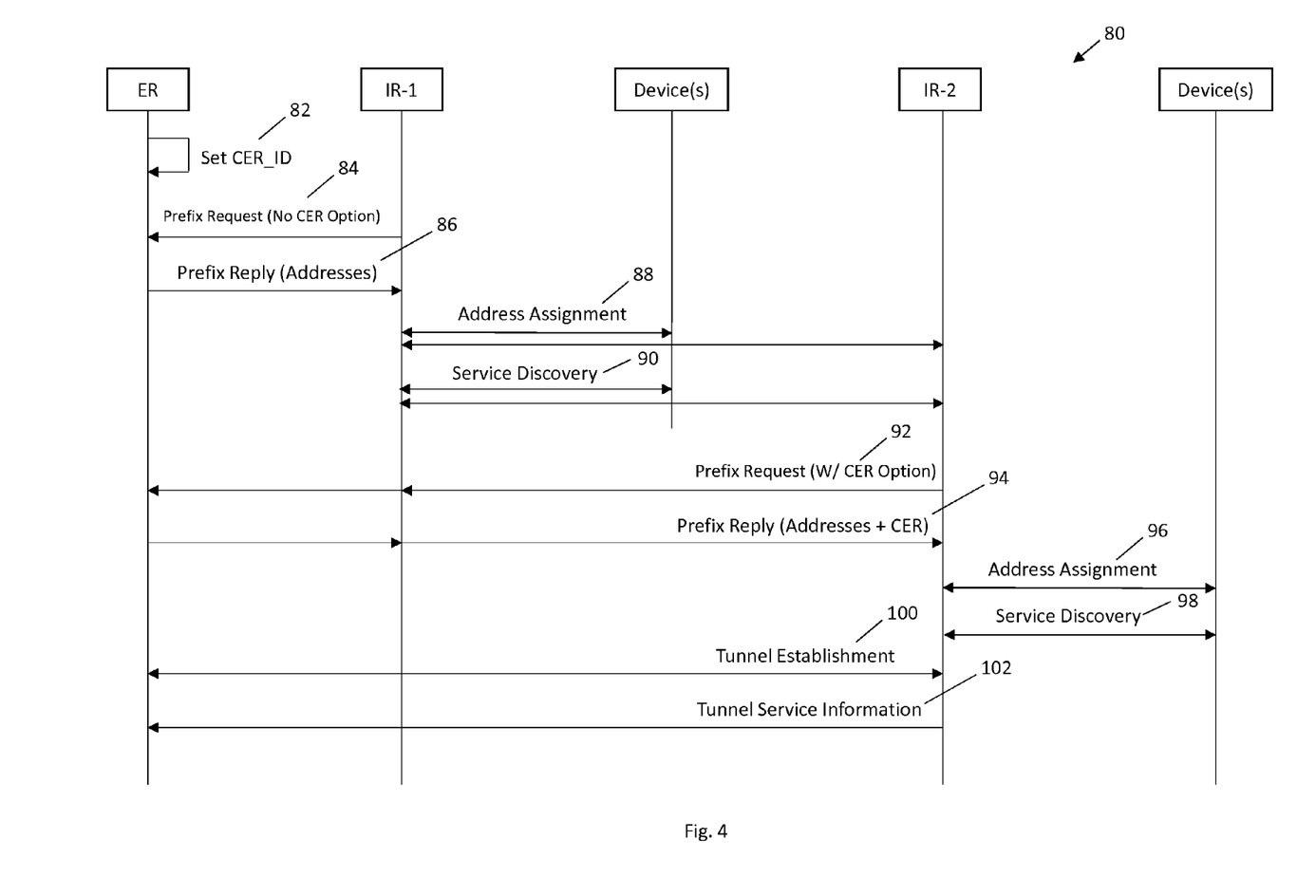
FIG. 4 illustrates a schematic for a method of facilitating tunnel establishment in accordance with one non-limiting aspect of the present invention.

FIG. 4 illustrates a schematic 80 for a method of facilitating tunnel establishment in accordance with one non-limiting aspect of the present invention. The tunnels may be utilized to provide network virtualization, overlay networking capabilities, networking functionality transparently operable from underlying connectivity and/or other desired packet transportation. The tunnels may optionally operate similarly to and extend the operation of the overlay networking contemplated in the U.S. patent application Ser. No. 13/652,700, entitled Overlay Network, the disclosure of which is hereby incorporated by reference in its entirety herein. The schematic describes tunnel establishment in an exemplary scenario where a first router (ER) is determined to be at the edge position, a second router (IR-1) is determined to be connected to the ER at an internal position and a third router (IR-2) is determined to be connected to IR-1 at an internal position. The ER and IR-2 may be HIPnet or other routers having capabilities commiserate with that described above with respect to the router 30 shown in FIG. 2. IR-1 may be a limited router or non-HIPnet router lacking some or all of the adaptive, self-directing capabilities of the router 30 shown in FIG. 2. IR-1 may optionally be configured to include similar capabilities as the ER and IR-2 to automatically establish tunnels and perform the other operations described herein and is described as lacking such capabilities in order to demonstrate a non-limiting use of the present invention to facilitate desired operations through a router lacking capabilities available to other routers in the multi-router network.

The ER may set 82 an IP or other suitable address, such as its LAN address, as a CER_ID. The ER may automatically determine the CER_ID using the position detection module 36 or other process sufficient for creating an address viable over the inside network 20 for directing packets thereto. The CER_ID may be included in any response the ER sends to a router/client that has included the CER Identification option code in an Option Request option. In this manner, the ER may set the CER_ID in the option and other routers can forward the CER_ID to subdelegated routers. IR-1 may transmit a DHCP or other suitable prefix request or solicit message 84 to the ER to obtain a prefix range of addresses suitable for assigning addresses to devices connected thereto and for subdelegation to IR-2 and/or any additional routers/devices connected thereto. Unlike IR-2 having the capabilities noted in FIG. 2, IR-1 may lack the ability to configure its up/WAN or down/LAN interfaces in a directionless manner such that a user may be required to properly connect the up/WAN and down/LAN interfaces in order to perform the operations contemplated herein. (While IR-1 is shown to be connected directly to the ER, IR-1 may operate similarly when connected downstream of another IR.)

IR-1 may transmit the prefix request 84 without setting the CER identification option code necessary for requesting or otherwise obtaining the CER_ID from the ER due to IR-1 lacking capabilities sufficient to do so. The ER may respond to the prefix request with a prefix reply 86 identifying the range of addresses suitable for use by IR-1 in performing addressing assignment for the connect devices and/or routers (IR-2). The ER may transmit the prefix reply 86 without including the CER_ID therein due to the failure of IR-1 to include the appropriate identification. Optionally, the ER may include the CER_ID in the prefix reply by default instead of relying upon IR-1 or other requesting router to request it whereby IR-1 or other router lacking capabilities sufficient to process the CER_ID may ignore or disregard the CER_ID if included by default. IR-1 may delegate addresses 88 included in the prefix reply to devices/routers connected thereto, i.e., those connected to a network link associated with one of the LAN interfaces of IR-1. The inability of IR-1 to ascertain the ER, either through the CER_ID or other position detection process noted herein, can prevent IR-1 from automatically determining an edge of the multi-router network without user involvement/programming.

IR-1 may include some automated capabilities, such as those associated with performing a service discovery 90 to determine services information for its connected devices/routers. The services information may relate to data collected from or provided to connected devices/routers, such as to facilitate advertising capabilities, synchronizing state, enabling border discovery, facilitating address prefix distribution, naming and other network related operations, e.g., according to LLDP, HNCP, Bonjour, mDNS, etc. IR-1 may be configured to implement service discovery 90 as a layer 2 or data link layer process whereby IR-1 is unable to transmit the discovered service information beyond the layer 3 or network layer boundary associated therewith, at least when operating according to LLDP, HNCP, Bonjour, or mDNS. The inability to communicate the services information beyond the IR-1 boundary can be problematic when a MSO or other service provider associated with the multi-router network 20, or another entity tasked with providing over-the-top (OTT) or other services thereto, desires to implement Network Functions Virtualization (NFV), cloud-based or software-based controls from the ER, from a server in the multi-router network 20 or from an entity operating within the outside network 14 as the attendant operations may require access to the services information or other data hidden behind the boundary of IR-1.

IR-1 may function without enabling cross-boundary service discovery and without recognizing the CER_ID in order to facilitate basic functionality and connectivity, thereby enabling consumers to utilize limited capabilities devices/routers within the multi-router network 20. One non-limiting aspect of the present invention contemplates addressing the inability of IR-1 to discover the CER_ID and/or facilitate cross-boundary communications with a process for automatically establishing tunnels. The contemplated tunnel(s) may be created through a limited/non-HIPnet router like IR-1 in order to facilitate cross-boundary access to hidden services information, management information bases (MIBs), advertisements, etc. being exchanged over network links below IR-1. The tunnel establishment is predominately description hereafter with respect to IR-2 tunneling through a limited/non-HIPnet router (IR-1) for non-limiting purposes as tunnels may be similarly established through the adaptive/HIPnet routers 30 shown in FIG. 2, such as with establishment of a tunnel originating at IR-4 tunneling through IR-3. The ER or other termination point may be configured as tunnel endpoint (TEP) having capabilities sufficient to manage multiple tunnels simultaneously, including capabilities sufficient for receiving multiple tunnels requests and creating mirroring tunnel interfaces.

IR-2 may transmit a prefix request 92 with the CER_ID option code set in order to identify the CER_ID associated with the ER. The prefix request 92 may be processed with IR-1 in the event IR-1 is acting as a delegating router for the purpose of providing an available IP address range or prefix to IR-2 within the prefix previously assigned to IR-1. Optionally, the prefix request 92 may be relayed through IR-1 or otherwise directed to the ER in the event IR-1 is unable to process the CER_ID option code or in the event the ER is responsible for delegating a prefix/address range to IR-2. The ER or IR-1 may transmit a prefix reply 94 to the prefix request 92 having the assigned prefix/addresses for IR-2. The prefix reply may include the CER_ID operable with the position detection module 36 of IR-2 to facilitate determining the ER as the edge router for the multi-router network 20. The included CER_ID may be formatted as an IP address or other address sufficient for directing messages over the multi-router network 20 to the ER. IR-2 may thereafter perform an address assignment 96 and a service discovery 98 in order to facilitate providing addresses to devices/routers connected thereto and to facilitate determining the above-noted services information or other data being exchanged over a network link associated therewith.

IR-2 may establish a tunnel terminating at the ER and traversing through IR-1 as part of a tunnel establishment 100. The tunnel establishment 100 may include the tunnel module 42 of IR-2 transmitting a tunnel request to the ER and receiving a tunnel reply having a unique identifier (ID) or other information for the corresponding tunnel sufficient to facilitate transmitting packets or other data therethrough. One non-limiting aspect of the present invention contemplates IR-2 automatically performing the tunnel establishment 100 without user interaction or direction so as to ameliorate complexities associated with facilitating creation of the multi-router network 20 contemplated herein. IR-2 may include capabilities sufficient for ascertaining the CER_ID from the prefix reply 94 or through other means and thereafter automatically address the tunnel request used to instigate the tunnel establishment 100 to the CER_ID or other address associated with the ER derived from the CER_ID. Transmission of the tunnel request may then trigger the ER to transmit the tunnel reply and to generate additional tunnel related information necessary for facilitating tunneled communications. The present invention contemplates the tunnel establishment utilizing various protocols and standards, which may vary the format and other information included in the tunnel request/reply or other messages that may be exchanged in order to create a tunnel.

IR-2 may transmit 102 the services information or other services discovery data through the tunnel to the ER or other endpoint terminating the tunnel. The services information may be encapsulated within packets or other constructs sufficient to facilitate delivery through the tunnel in a manner enabling the encapsulated packets to traverse the layer 3 boundary of IR-1. One non-limiting aspect of the present invention contemplates the devices/routers connected to IR-2 transmitting frames as part of a particular service discovery protocol to IR-2 or otherwise broadcasting them over an associated network link. IR-2 may be configured to automatically encapsulate the corresponding frames for transmission through the tunnel upon receipt, i.e., each frame or grouping of frames may be slavishly or automatically relayed through the tunnel. LLDP relies upon Link Layer Discovery Protocol data units (LLDPDUs) to transmit and receive services information/frames, which IR-2 may be configured to individually encapsulate for transport through the tunnel. (Similar processes may be implemented for other standards or protocols used to exchange information that may be useful to the ER or otherwise blocked with IR-1.) The ability to automatically tunnel the service discovery information or any other information identified as being valuable or useful to the ER may be beneficial in enabling the ER visibility behind IR-1 as if the ER was connected to the network link downstream of IR-2 originating the encapsulated information.

Figure 5:
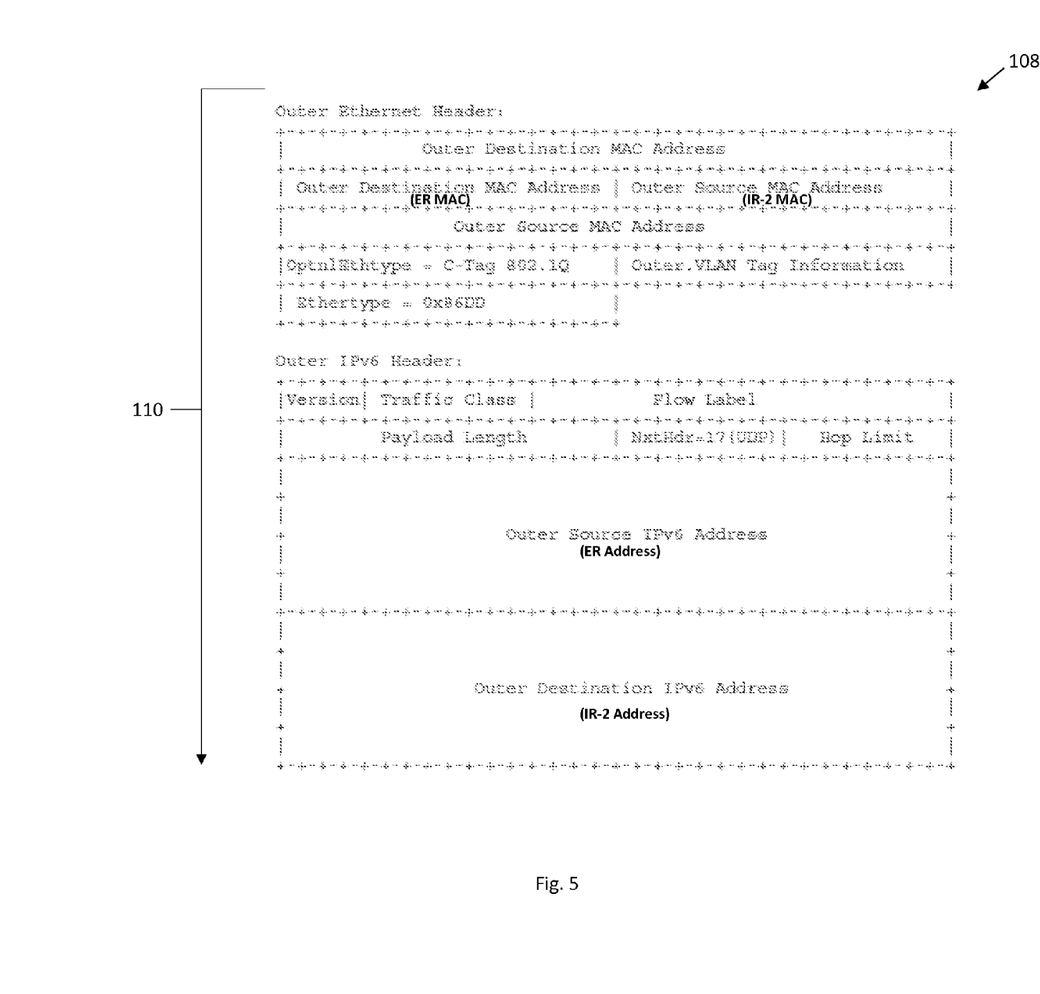
FIG. 5 illustrates a tunneled packet having a frame encapsulated for tunnel transport in accordance with one non-limiting aspect of the present invention.

FIG. 5 illustrates a tunneled packet 108 having a frame encapsulated for tunnel transport in accordance with one non-limiting aspect of the present invention. The frame being encapsulated may correspond with the services information determined from the service discovery 98 or other frame/packets desired for transport through a tunnel, such as the tunnel originating at IR-2 and terminating at the ER. The tunneled packet 108 is illustrated with respect to the tunneling parameters associated with VXLAN for exemplary non-limiting purposes as any other tunneling protocol/standard may be used without deviating from the scope and contemplation of the present invention. One non-limiting aspect of the present invention contemplates the tunnel module 42 of IR-2 being configured to automatically populate values and other information included within the tunneled packet 108 according to information derived from the above-identified processes as well as additional processes that may be resident on or available to IR-2. The tunneled packet 108 is shown to include an outer portion 110 and an inner portion 112 where the outer portion 110 includes information, values, etc. utilized for transporting the tunneled packet 108 and the inner portion 112 includes the services information (frame) or other data being encapsulated.

The outer portion 110 is shown to include: an outer Ethernet header having an outer destination Media Access Control (MAC) address assigned to the ER and an outer source MAC address assigned to IR-2; an outer Internet Protocol (IP) header (shown is IPv6 but may be IPv4) having the ER address (CER_ID) as an outer source address (while the CER_ID is shown as the outer source address, other address(es) associated with the ER or otherwise sufficient for routing may be similarly used) and an IP address assigned to the IR-2 as an outer destination address; an outer User Datagram Protocol (UDP) header having a source port with a dynamic value generated by hashing a portion of the encapsulated frame and a destination port having a default value assigned to the tunnel; and a tunnel (VXLAN) having a tunnel identifier (VNI) assigned to the tunnel by the ER or IR-2 (IR-2 may determine the tunnel ID from information include in the tunnel response transmitted from the ER). The inner portion 112 is shown to include: an inner Ethernet header having an inner destination Media Access Control (MAC) address assigned to IR-2 and an inner source MAC address assigned to the device transmitting the corresponding frame; and a payload having the services information (LLDPDU) desired for tunneling to the ER. Additional fields, values, etc. are shown in accordance with the VXLAN process, which may be similarly included in an automated fashion by the tunnel module 42 or other processes/capabilities of IR-2.

As supported above, one non-limiting aspect of the present invention contemplates facilitating adaptive functionality on a home router that changes based on the role played by the router (e.g. whether it is at the customer edge or internal to the network). The process is contemplated by the present invention may be beneficial in providing security throughout the home network, while providing extra protection at the edge. This may enable enhanced communication within the home, while also securing the home from unwanted attack. One non-limiting aspect of the present invention contemplates a virtual home network using tunnels to encapsulate traffic inside the home. This may include terminating all tunnels on the cable gateway (aka customer edge router, CER) whereby devices inside the home learn the address of the CER via a DHCP option (CER ID) carrying the CER IP address. Once internal routers and hosts learn of the CER address, they can use that address as the destination address for a corresponding tunnel. When the Cable Gateway sees the incoming tunnel request, it can provision its own tunnel interface to mirror the incoming request to provide visibility behind layer 3 or other boundaries created within the home network. One aspect of this invention facilitates virtual home networks, and allows MSOs to have visibility into devices and services running in the home that could not easily be seen with traditional network architectures. It allows for automatic tunnel creation as manual tunnel creation is seen as too difficult for the average subscriber.

One non-limiting aspect of the present invention facilitates the automatic establishment of VXLAN tunnels inside a virtual home network. One non-limiting aspect of the present invention also contemplates a virtual home network using VXLAN tunnels to encapsulate traffic inside the home. VXLAN is an emerging network approach used in datacenters to establish overlay networks. We contemplate setting up an overlay network in the home. One problem with establishing the home overlay network is automatically provisioning VXLAN tunnels. The device provisioning the tunnel needs to identify the far end. One solution to this problem is to terminate all tunnels on the cable gateway (aka customer edge router, CER). Devices inside the home learn the address of the CER via a DHCP option (CER ID) carrying the CER IP address. Once internal routers and hosts learn of the CER address, they use that address as the destination address for the tunnel. When the Cable Gateway sees the incoming tunnel request, it provisions its own tunnel interface to mirror the incoming request. This solution could be extended to work with GRE or other tunneling methods. This invention facilitates virtual home networks, and allows MSOs to have visibility into devices and services running in the home that could not easily be seen with traditional network architectures. It allows for automatic tunnel creation; manual tunnel creation is seen as too difficult for the average subscriber.

One non-limiting aspect of the present invention contemplates an automatic tunnel using a CER-ID, such as to further visibility (telemetry) when a non-cable compliant home gateway or other device is deployed, which may be created as follows:

(1) Upon power-up, each home router provisions itself using HIPNet and determines whether it is a CER or IR. As part of this determination, it also requests the DHCP CER ID option, identifying the CER.

(2) The CER ID option is propagated downstream through all other IRs providing DHCP. Each HIPnet IR now has both its IP address and the IP address of the CER (the older patent app).

(3) The IR initiates a VXLAN tunnel to the CER, using its 'up' IP interface as the source address and the CER ID as the destination.

(4) The CER validates that the incoming VXLAN tunnel is initiated from a source address in its delegated prefix (from the MSO).

(5) Since VXLAN encapsulates Ethernet and IP inside a UDP packet, this tunnel can be established through non-HIPNet (and non-virtual-home-network) routers. The IR applies a VXLAN header (IP+UDP) on all incoming Ethernet frames on the 'down' interface (or at least those destined for upstream devices) so that raw Ethernet frames (including MAC addresses for all devices) are now visible to the CER and beyond.

(6) If a non-HIPnet router is in the path between two HIPnet routers, all devices connected to the HIPnet routers still maintain MAC address visibility because tunnels are established despite the non-HIPnet router.

What is claimed is:

1. A non-transitory computer-readable medium having a plurality of non-transitory instructions sufficient to facilitate tunnel functionality within a multi-router network having a plurality of routers arranged in a logical hierarchy, the non-transitory instructions being sufficient for:
   determining edge router (ER) information for a one of the plurality of routers arranged in the logical hierarch as an ER;
   terminating a tunnel originating with a first internal router (IR) of the plurality of routers at the ER based at least in part on the ER information, the tunnel being a Virtual Extensible Local Area Network (VXLAN) tunnel and the first IR being arranged in the logical hierarchy downstream of the ER;
   determining an ER address for the ER from the ER information;
   determining a tunnel request transmitted from the first IR to instigate the tunnel being addressed to the ER address; and
   setting an ER identification option code for a Dynamic Host Configuration Protocol (DHCP) solicit message transmitted from the first IR to the ER, the ER identification option code instructing the ER to include the ER address within a corresponding response message processed at the first IR to determine the ER address.

2. The non-transitory computer-readable medium of claim 1 further comprising non-transitory instructions sufficient for:
   determining services information for a device connected downstream of the first IR; and
   transporting the services information from the first IR to the ER through the tunnel.

3. The non-transitory computer-readable medium of claim 2 further comprising non-transitory instructions sufficient for:
   determining the services information to be included within a frame transmitted from the device to the first IR; and
   encapsulating the frame within one or more headers for transport from the first IR to the ER through the tunnel.

4. The non-transitory computer-readable medium of claim 3 further comprising non-transitory instructions sufficient for including an outer Internet Protocol (IP) header as one of the one or more headers, the outer IP header including the ER address as an outer source address and a first address assigned to the first IR as an outer destination address.

5. The non-transitory computer-readable medium of claim 4 further comprising non-transitory instructions sufficient for including a tunnel header as one of the one or more headers, the tunnel header including a tunnel identifier (ID) assigned to the tunnel.

6. The non-transitory computer-readable medium of claim 5 further comprising non-transitory instructions sufficient for determining the tunnel ID from a tunnel response transmitted from the ER to the first IR in response to receipt of the tunnel request.

7. The non-transitory computer-readable medium of claim 5 further comprising non-transitory instructions sufficient for including an outer Ethernet header as one of the one or more headers, the outer Ethernet header including an outer destination Media Access Control (MAC) address assigned to the ER and an outer source MAC address assigned to the first IR.

8. The non-transitory computer-readable medium of claim 7 further comprising non-transitory instructions sufficient for including an outer User Datagram Protocol (UDP) header as one of the one or more headers, the outer UDP header including a source port having a dynamic value generated by hashing a portion of the frame and a destination port having a default value assigned to the tunnel.

9. The non-transitory computer-readable medium of claim 3 further comprising non-transitory instructions sufficient for determining the frame to be formatted as a Link Layer Discovery Protocol data unit (LLDPDU).

10. The non-transitory computer-readable medium of claim 9 further comprising non-transitory instructions sufficient for determining the frame to include an inner destination Media Access Control (MAC) address assigned to the first IR and an inner source MAC address assigned to the device.

11. The non-transitory computer-readable medium of claim 3 further comprising non-transitory instructions sufficient for encapsulating the frame for transport through the tunnel via a second IR connected between the ER and the first IR, the second IR lacking capabilities for communicating services information to the ER for devices connected thereto.

12. A multi-router networking system comprising:
   an edge router (ER) configured to interface packets between an inside network and an outside network;
   a non-home Internet Protocol (IP) network (non-HIPnet) router configured to interface packets between the home network and at least a first device connected downstream thereof;
   a HIPnet router configured to interface packets between the non-HIPnet router and at least a second device connected downstream thereof, the HIPnet router configured to:
   i) create a tunnel terminating at the ER through the non-HIPnet router, the tunnel being a Virtual Extensible Local Area Network (VXLAN) tunnel;
   ii) encapsulate service information determined for the second device for transport within the tunnel to the ER;
   iii) set an ER identification option code for a Dynamic Host Configuration Protocol (DHCP) solicit message transmitted through the non-HIPnet router to the ER; and
   iv) determine the ER address from information included a response message transmitted from the ER in response to receipt of the DHCP solicit message.

13. The system of claim 12 wherein the HIPnet router is configured to transmit a tunnel request through the non-HIPnet router to an ER address associated with the ER router, the tunnel request being sufficient to instigate the tunnel with the ER.

14. The system of claim 13 wherein the HIPnet router is configured to:
   determine the services information from a frame transmitted from the second device, the frame being formatted as a Link Layer Discovery Protocol data unit (LLDPDU) and having an inner destination Media Access Control (MAC) address assigned to the HIPnet router and an inner source MAC address assigned to the second device;
   encapsulate the frame within a plurality of headers for transport to the ER through the tunnel, the plurality of headers including:

i) an outer Internet Protocol (IP) header having the ER address as an outer source address and a first address assigned to the HIPnet router as an outer destination address;

ii) a tunnel header having a tunnel identifier (ID) assigned to the tunnel;

iii) an outer Ethernet header having an outer destination Media Access Control (MAC) address assigned to the ER and an outer source MAC address assigned to the HIPnet router; and iv) an outer User Datagram Protocol (UDP) having a source port with a dynamic value generated by hashing a portion of the frame and a destination port with a default value assigned to the tunnel.

15. A router comprising:

a plurality of interfaces configured for routing data packets, including at least one up interface and at least one down interface;

a position detection module associated with a non-transitory computer-readable medium having a plurality of instructions executable with a processor to determine a position of the router within a multi-router network to be one of an edge position and an internal position; and a tunnel module associated with a non-transitory computer-readable medium having a plurality of instructions executable with a processor to:

i) implement a tunnel endpoint (TEP) sufficient for decapsulating frames encapsulated within a tunnel terminating at at least one of the down interface when the position is determined to be the edge position;

ii) create a tunnel at one of the at least one up interface to terminate at an edge router (ER) in the multi-router network determined to be at the edge position when the position is determined to be the internal position, the tunnel being a Virtual Extensible Local Area Network (VXLAN) tunnel;

iii) set an ER identification option code for a Dynamic Host Configuration Protocol (DHCP) solicit message transmitted through the at least one up interface; and iv) determine an ER address from information included in a response message transmitted from the ER.

16. The router of claim 15 wherein i) the plurality of instructions of the non-transitory computer-readable medium of the tunnel module are executable with the processor to transmit a tunnel request to the ER address to create the tunnel terminating at the ER.

17. The router of claim 15 wherein the plurality of instructions of the non-transitory computer-readable medium of the tunnel module are executable with the processor to:

determine services information for a device connected to the at least one down interface; and encapsulate the services information within one or more headers for transport through the tunnel to the ER.

* * * * *